US012621837B2

(12) United States Patent
Li

(10) Patent No.: US 12,621,837 B2
(45) Date of Patent: May 5, 2026

(54) METHOD FOR RELEASING UPLINK RESOURCE, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Haitao Li, Dongguan (CN)

(73) Assignee: GUANGDONG OPPO MOBILE TELECOMMUNICATIONS CORP. LTD., Dongguan (CN)

( * ) Notice: Subject to any disclaimer, the term of this patent is extended or adjusted under 35 U.S.C. 154(b) by 746 days.

(21) Appl. No.: 17/941,243

(22) Filed: Sep. 9, 2022

(65) Prior Publication Data

US 2023/0015847 A1     Jan. 19, 2023

Related U.S. Application Data

(63) Continuation of application No. PCT/CN2020/078472, filed on Mar. 9, 2020.

(51) Int. Cl.
*H04W 72/23* (2023.01)
*H04W 36/00* (2009.01)
(Continued)

(52) U.S. Cl.
CPC ....... *H04W 72/23* (2023.01); *H04W 36/0072* (2013.01); *H04W 72/1268* (2013.01); *H04W 74/0833* (2013.01); *H04W 36/00725* (2023.05)

(58) Field of Classification Search
CPC ............. H04W 72/23; H04W 36/0072; H04W 72/1268; H04W 36/00725;
(Continued)

(56) References Cited

U.S. PATENT DOCUMENTS

2008/0242304 A1* 10/2008 Ju ..................... H04W 36/0066
                                                       455/439
2015/0195753 A1* 7/2015 Jung ..................... H04W 76/19
                                                       370/331
(Continued)

FOREIGN PATENT DOCUMENTS

CN      109076417 A     12/2018
CN      109565721 A     4/2019
WO      2019160342 A1   8/2019

OTHER PUBLICATIONS

ZTE Corporation. "Email discussion report on open issues of mobility enhancement", 3GPP TSG-RAN2 Meeting #96 R2-168184, Nov. 18, 2016 (Nov. 18, 2016), full text, section 2.
(Continued)

*Primary Examiner* — Chuong M Nguyen
(74) *Attorney, Agent, or Firm* — Ladas & Parry LLP

(57) ABSTRACT

A method for releasing an uplink resource, a terminal device and a network device are provided. The method includes that: a terminal device transmits a handover complete message through an uplink grant resource in a first type of handover; and the terminal device releases the uplink grant resource in case that a preset condition is met. The uplink grant resource is an uplink resource, configured in a handover command, for accessing a target network device. The preset condition includes at least one of: an uplink timer expires, a first downlink channel for scheduling an uplink transmission resource for new transmission is monitored, or indication information for instructing to release the uplink grant resource is received.

15 Claims, 15 Drawing Sheets

(51) Int. Cl.
  *H04W 72/1268* (2023.01)
  *H04W 74/0833* (2024.01)

(58) Field of Classification Search
  CPC .......... H04W 74/0833; H04W 36/0079; H04L
  5/0053; H04L 5/0044
  See application file for complete search history.

(56) References Cited

U.S. PATENT DOCUMENTS

| | | | |
|---|---|---|---|
| 2018/0020382 A1* | 1/2018 | Kim | H04L 1/1819 |
| 2018/0049079 A1 | 2/2018 | Ozturk et al. | |
| 2018/0152868 A1* | 5/2018 | Uchino | H04W 36/16 |
| 2018/0332507 A1* | 11/2018 | Fujishiro | H04W 36/00692 |
| 2019/0104452 A1 | 4/2019 | Park | |
| 2020/0120560 A1* | 4/2020 | Sunell | H04W 36/00725 |
| 2020/0137639 A1* | 4/2020 | Yuan | H04W 76/30 |
| 2020/0146087 A1* | 5/2020 | Ponnamreddy | H04W 36/0033 |
| 2020/0367118 A1 | 11/2020 | Fujishiro et al. | |
| 2020/0389886 A1* | 12/2020 | Lee | H04W 74/0808 |
| 2021/0153204 A1* | 5/2021 | Takeda | H04L 1/1896 |
| 2021/0176677 A1 | 6/2021 | Lee et al. | |
| 2022/0191760 A1* | 6/2022 | Kim | H04L 1/08 |

OTHER PUBLICATIONS

Ericsson. "Release of UL grant at RACH-less procedures", 3GPP TSG-RAN WG2 #97 Tdoc R2-1701552, Feb. 17, 2017 (Feb. 17, 2017), full text, section 2.
International Search Report in the international application No. PCT/CN2020/078472, mailed on Dec. 1, 2020.
Written Opinion of the International Search Authority in the international application No. PCT/CN2020/078472, mailed on Dec. 1, 2020.
3GPP TSG RAN WG2 Meeting #95 R2-165181, Gothenburg, Sweden, Aug. 22-26, 2016, Source: CATT, Title: Issues on RACH-less handover. Agenda Item: 8.6.1, Document for: Discussion and Decision.
Supplementary European Search Report in the European application No. 20924811.1, mailed on Feb. 22, 2023.
First Office Action of the European application No. 20924811.1, issued on Feb. 10, 2025, 11 pages.

* cited by examiner

100

110

120

120

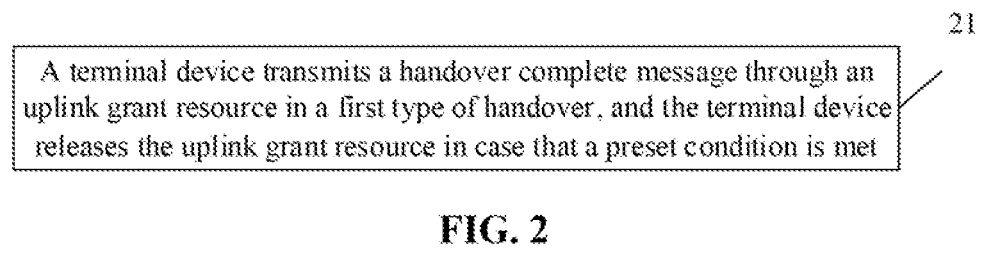

21

A terminal device transmits a handover complete message through an uplink grant resource in a first type of handover, and the terminal device releases the uplink grant resource in case that a preset condition is met

FIG. 2

Figure 3:
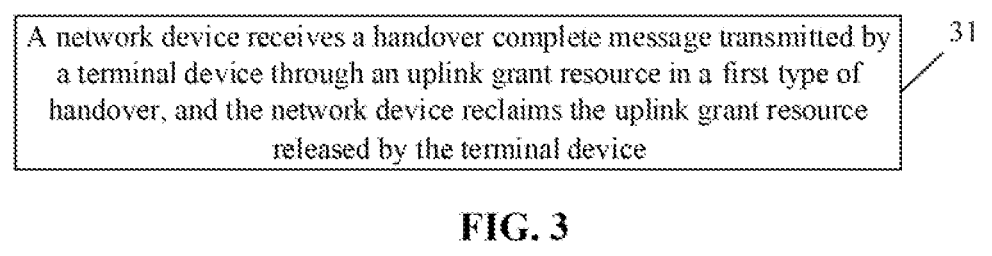

A network device receives a handover complete message transmitted by a terminal device through an uplink grant resource in a first type of handover, and the network device reclaims the uplink grant resource released by the terminal device

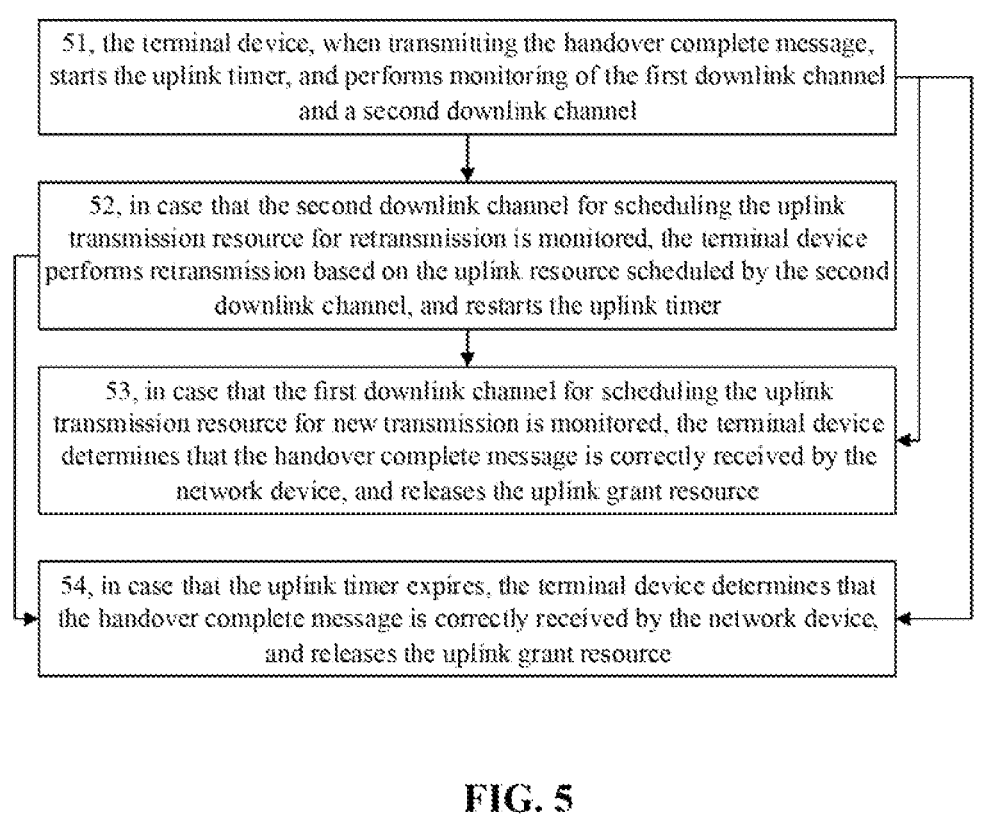

51, the terminal device, when transmitting the handover complete message, starts the uplink timer, and performs monitoring of the first downlink channel and a second downlink channel 52, in case that the second downlink channel for scheduling the uplink transmission resource for retransmission is monitored, the terminal device performs retransmission based on the uplink resource scheduled by the second downlink channel, and restarts the uplink timer 53, in case that the first downlink channel for scheduling the uplink transmission resource for new transmission is monitored, the terminal device determines that the handover complete message is correctly received by the network device, and releases the uplink grant resource 54, in case that the uplink timer expires, the terminal device determines that the handover complete message is correctly received by the network device, and releases the uplink grant resource

FIG. 5

Second communication unit 91

FIG. 12

METHOD FOR RELEASING UPLINK RESOURCE, TERMINAL DEVICE, AND NETWORK DEVICE

This application is a continuation of PCT international Application No. PCT/CN2020/078472 filed on Mar. 9, 2020, the contents of which are incorporated herein by reference in its entirety.

TECHNICAL FIELD

Background

At present, a target cell may reasonably configure a time-domain position of an uplink resource in a handover command during a handover process, such that a terminal device transmits a handover complete message when accessing the target cell. The uplink resource in the handover command is relatively small, and is mainly used for the terminal device to report the handover complete message but not suitable for uplink transmission of ordinary data. Therefore, how to avoid the waste of uplink transmission resources becomes a problem that needs to be solved.

SUMMARY

The disclosure relates to the field of communication technologies, and provides a method for releasing an uplink resource, a terminal device, and a network device.

In a first aspect, there is provided a method for releasing an uplink resource, which includes the following operations.

A terminal device transmits a handover complete message through an uplink grant resource in a first type of handover, and the terminal device releases the uplink grant resource in case that a preset condition is met. The UL grant resource is an uplink resource, configured in a handover command, for accessing a target network device.

The preset condition includes at least one of: an uplink timer expires, a first downlink channel for scheduling an uplink transmission resource for new transmission is monitored, or indication information for instructing to release the uplink grant resource is received.

In a second aspect, there is provided a method for releasing an uplink resource, which includes the following operations.

A network device receives a handover complete message transmitted by a terminal device through an uplink grant resource in a first type of handover, and the network device reclaims the uplink grant resource released by the terminal device. The UL grant resource is an uplink resource, configured for the terminal device in a handover command, for accessing a target network device.

In a third aspect, there is provided a terminal device, which includes a processor, a transceiver, and a memory coupled with the processor and the transceiver.

The memory is configured to store computer programs that, when executed by the processor, cause the processor to: control the transceiver to transmit a handover complete message through an uplink grant resource in a first type of handover; and release the uplink grant resource in case that a preset condition is met. The UL grant resource is an uplink resource, configured in a handover command, for accessing a target network device.

The preset condition includes at least one of: an uplink timer expires, a first downlink channel for scheduling an uplink transmission resource for new transmission is monitored, or indication information for instructing to release the uplink grant resource is received.

In a fourth aspect, there is provided a network device, which includes a processor, a transceiver, and a memory coupled with the processor and the transceiver.

The memory is configured to store computer programs that, when executed by the processor, cause the processor to: control the transceiver to receive a handover complete message transmitted by a terminal device through an uplink grant resource in a first type of handover; and reclaim the uplink grant resource released by the terminal device. The UL grant resource is an uplink resource, configured for the terminal device in a handover command, for accessing a target network device.

BRIEF DESCRIPTION OF THE DRAWINGS

FIG. 2 is a first flowchart of a method for releasing an uplink resource according to an embodiment of the disclosure.

FIG. 3 is a second flowchart of a method for releasing an uplink resource according to an embodiment of the disclosure.

FIG. 5 is a third flowchart of a method for releasing an uplink resource according to an embodiment of the disclosure.

FIG. 12 is a structure diagram of composition of a network device according to an embodiment of the disclosure.

DETAILED DESCRIPTION

In order to make the characteristics and technical contents of the embodiments of the disclosure understood in more detail, the implementation of the embodiments of the disclosure will be described in detail below with reference to the drawings. The accompanying drawings are only for reference and not intended to limit the embodiments of the disclosure.

The technical solutions in the embodiments of the disclosure will be described below with reference to the drawings in the embodiments of the disclosure. It is apparent that the described embodiments are part of embodiments of the disclosure, not all of the embodiments. All other embodiments obtained by those of ordinary skill in the art based on the embodiments of the disclosure without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5th-Generation (5G) system.

Figure 1:
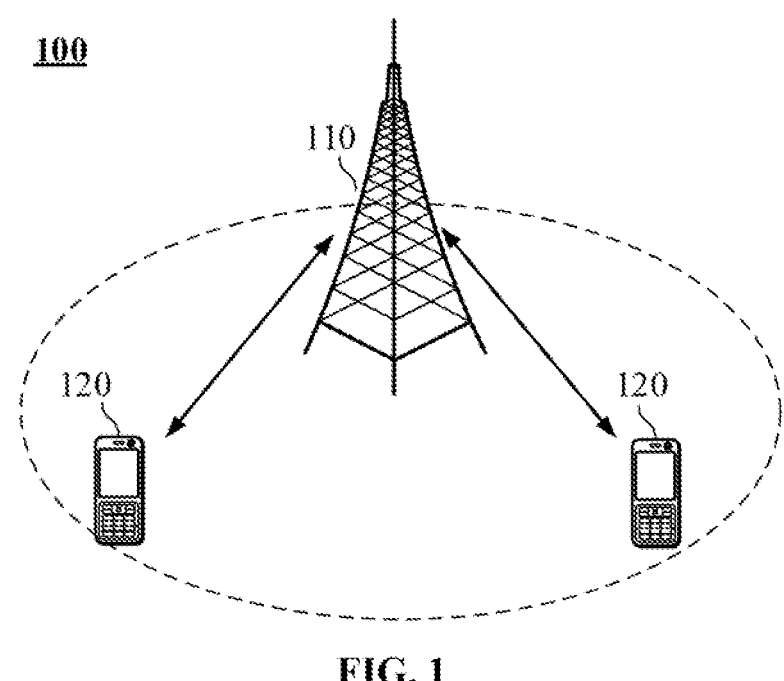
FIG. 1 is a first diagram of architecture of a communication system according to an embodiment of the disclosure.

Exemplarily, a communication system 100 to which the embodiments of the disclosure are applied may be shown in FIG. 1. The communication system 100 may include a network device 110. The network device 110 may be a device communicating with User Equipment (UE) 120 (or referred to as a communication terminal device or a terminal device). The network device 110 may provide communication coverage for a specific geographical region and communicate with UE(s) in the coverage. Optionally, the network device 110 may be a Base Transceiver Station (BTS) in the GSM or the CDMA system, or may be a NodeB (NB) in the WCDMA system, or may be an Evolutional Node B (eNB or eNodeB) in the LTE system or a wireless controller in a Cloud Radio Access Network (CRAN). Alternatively, the network device may be a mobile switching center, a relay station, an access point, a vehicle device, a wearable device, a hub, a switch, a network bridge, a router, a network-side device in a future 5G network, a network device in a future evolved Public Land Mobile Network (PLMN), or the like.

The communication system 100 further includes at least one UE 120 within the coverage of the network device 110. The "UE" as used herein includes, but not limited to, a device configured to receive/send a communication signal through a wired line connection, such as, Public Switched Telephone Network (PSTN), Digital Subscriber Line (DSL), digital cable and direct cable connections; and/or through another data connection/network; and/or through a wireless interface, such as, a cellular network, a Wireless Local Area Network (WLAN), a digital television network like a Digital Video Broadcasting-Handheld (DVB-H) network, a satellite network, and an Amplitude Modulated (AM)-Frequency Modulated (FM) broadcast transmitter; and/or through another UE, and/or includes an Internet of Things (IoT) device. The UE configured to communicate through a wireless interface may be referred to as a "wireless communication terminal device", a "wireless terminal device", or a "mobile terminal device".

Optionally, Device to Device (D2D) communication may be performed between the UEs 120.

In order to serve periodic services better, the concept of "pre-configured resource" is introduced, which may be referred to as Semi-Persistent Scheduling (SPS) for downlink and Configured Grant (CG) for uplink.

The New Radio (NR) supports transmission of the following two types of uplink CGs.

Physical Uplink Shared Channel (PUSCH) transmission based on configured grant Type 1: a network configures, through Radio Resource Control (RRC), all transmission resources and transmission parameters including a time-domain resource, a frequency-domain resource, a period of the time-domain resource, a Modulation and Coding Scheme (MCS), the number of repetitions, frequency hopping, the number of Hybrid Automatic Repeat reQuest (HARQ) processes, and the like. After receiving the RRC configuration, the terminal may immediately perform PUSCH transmission on the configured time-frequency resources by use of the configured transmission parameters.

PUSCH transmission based on configured grant Type 2: a two-step resource configuration method is adopted. First, the network configures, through RRC, transmission resources and transmission parameters including a period of a time-domain resource, the number of repetitions, frequency hopping, the number of HARQ processes, and the like. Then, PUSCH transmission based on configured grant Type 2 is activated by a Physical Downlink Control Channel (PDCCH) scrambled with a Configured scheduling-Radio Network Temporary Identifier (CS-RNTI), and other transmission resources and transmission parameters including the time-domain resource, a frequency-domain resource, an MCS, and the like are configured at the same time. When receiving RRC configuration parameters, the UE cannot immediately perform PUSCH transmission by use of the resources and parameters configured by the configuration parameters, but can only perform PUSCH transmission after receiving the corresponding PDCCH activation and the other resources and parameters are configured.

For the UE, the maximum number of HARQ processes is 16. For each CG configuration, the network configures a limited number of HARQ process Identifiers (IDs) for the CG configuration. The UE performs uplink transmission on the CG resources by use of these HARQ process IDs in a polling manner. It is assumed that the HARQ process ID for the CG resource at time t0 and the HARQ process ID for the CG resource at time t1 are both HARQ ID i. The UE, upon packaging Media Access Control (MAC) Protocol Data Unit (PDU) 1 at the time t0, stores MAC PDU 1 in HARQ ID i. At the time t1, since the HARQ process ID is the same as that used at the time t0, MAC PDU 1 will be flushed even though MAC PDU 1 has not been transmitted correctly at this time. Therefore, a configuredGrantTimer for per HARQ process is introduced. A maintenance method for the configuredGrantTimer is as follows.

If the UE performs uplink transmission on a resource scheduled by a PDCCH, and a HARQ process used for the uplink transmission can be used for the transmission of a CG, the UE starts or restarts a configuredGrantTimer corresponding to the HARQ process.

If the UE performs uplink transmission on a CG resource, the UE starts or restarts the configuredGrantTimer corresponding to the HARQ process.

If the UE receives a PDCCH indicating activation of the configured grant Type 2, the UE stops the configuredGrantTimer in running.

Before a configuredGrantTimer corresponding to a certain HARQ process expires (or times out), a MAC PDU stored in the HARQ process cannot be flushed.

It is to be understood that the terms "system" and "network" in the disclosure may usually be interchanged herein. Term "and/or" in the disclosure is only an association relationship describing associated objects, and represents that three relationships may exist. For example, A and/or B may represent three conditions: i.e., existence of A alone, existence of both A and B, and existence of B alone. In addition, character "/" in the disclosure usually represents that previous and next associated objects form an "or" relationship.

In order to make the characteristics and technical contents of the embodiments of the disclosure understood in more detail, the implementation of the embodiments of the disclosure will be described in detail below with reference to the drawings. The accompanying drawings are only for illustrative purposes and not intended to limit the embodiments of the disclosure.

An embodiment of the disclosure provides a method for releasing an uplink resource, as illustrated in FIG. 2. The method includes the following operations.

In an operation 21, a terminal device transmits a handover complete message through an uplink grant resource in a first type of handover, and the terminal device releases the uplink grant resource in case that a preset condition is met. The UL grant resource is an uplink resource, configured in a handover command, for accessing a target network device.

The preset condition includes at least one of: an uplink timer expires, a first downlink channel for scheduling an uplink transmission resource for new transmission is monitored, or indication information for instructing to release the uplink grant resource is received.

In the processing of a network device, an embodiment of the disclosure further provides a method for releasing an uplink resource, as illustrated in FIG. 3. The method includes the following operations.

In an operation 31, a network device receives a handover complete message transmitted by a terminal device through an uplink grant resource in a first type of handover, and the network device reclaims the uplink grant resource released by the terminal device. The uplink grant resource is an uplink resource, configured for the terminal device in a handover command, for accessing a target network device.

The embodiments of the disclosure may be applied to a Non Terrestrial Network (NTN). Certainly, the solutions of the embodiments are not limited to being applicable only to the NTN scenario, and may also be applied to other communication scenarios (such as NR and LTE). Correspondingly, the network device may be a base station (such as a gNB or an eNB) in a terrestrial communication network, or a satellite in the NTN.

The NTN provides communication services for terrestrial user(s) by means of satellite communication. Compared with the terrestrial cellular network communication, the satellite communication has many unique advantages. First, the satellite communication is not limited by the geographical region where the user is located. For example, the general terrestrial communication cannot cover regions (such as oceans, high mountains, and deserts) where network devices cannot be set up, or regions that are not covered by communications due to sparse population. For the satellite communication, a satellite may cover a relatively large terrestrial region and may orbit the earth, so the satellite communication may theoretically cover everywhere on the earth. Second, the satellite communication has relatively high social value. The satellite communication may cover remote mountain areas and poor and backward countries or regions at relatively low cost, so that people in these regions may enjoy advanced voice communication and mobile Internet technologies. This contributes to reducing digital divides with developed regions and prompting the development of these regions. Third, the distance of the satellite communication is long, and the cost of the communication does not increase significantly as the communication distance increases. Finally, the satellite communication is highly stable and not limited by natural disasters.

The communication satellites are divided, according to different orbit altitudes, into a Low-Earth Orbit (LEO) satellite, a Medium-Earth Orbit (MEO) satellite, a Geostationary Earth Orbit (GEO) satellite, a High Elliptical Orbit (HEO) satellite, and the like.

An altitude of the LEO satellite ranges from 500 km to 1,500 km, and correspondingly, an orbital period approximately ranges from 1.5 hours to 2 hours. A signal propagation delay of single-hop communication between users is usually less than 20 ms. The maximum visible time of the satellite is 20 minutes. The signal propagation distance is short, the link loss is low, and the requirement for transmit power of a user terminal is not so high.

An orbit altitude of the GEO satellite is 35,786 km, and a period of the satellite revolving around the earth is 24 hours. A signal propagation delay of single-hop communication between users is usually 250 ms.

In order to ensure the coverage of a satellite and improve the system capacity of the whole satellite communication system, the satellite covers the ground through multiple beams. A satellite may form tens of or even hundreds of beams to cover the ground. A satellite beam may cover a terrestrial region with a diameter of tens to hundreds of kilometers.

In the embodiment, the first type of handover may be Random Access Channel-less (RACH-less) handover. Certainly, the solution provided in the embodiment is preferably applicable to the RACH-less handover, but is not limited to be applicable only to the RACH-less handover.

Related descriptions about different types of handovers are made below.

A handover process of a terminal device in a connected state supported by an NR system may include the following processing. When the terminal device that is using a network service moves from one cell to another cell or due to wireless transmission service load adjustment, activation operation and maintenance, device failure and the like, for ensuring the continuity of communication and the quality of service, the system needs to transfer a communication link between the terminal device and the source cell to the new cell, that is, the handover process is executed. An Xn interface handover process is taken as an example to describe a corresponding handover process. The entire handover process is divided into the following three stages including a handover preparation stage, a handover execution stage and a handover complete stage, as illustrated in FIG. 4.

Figure 4:
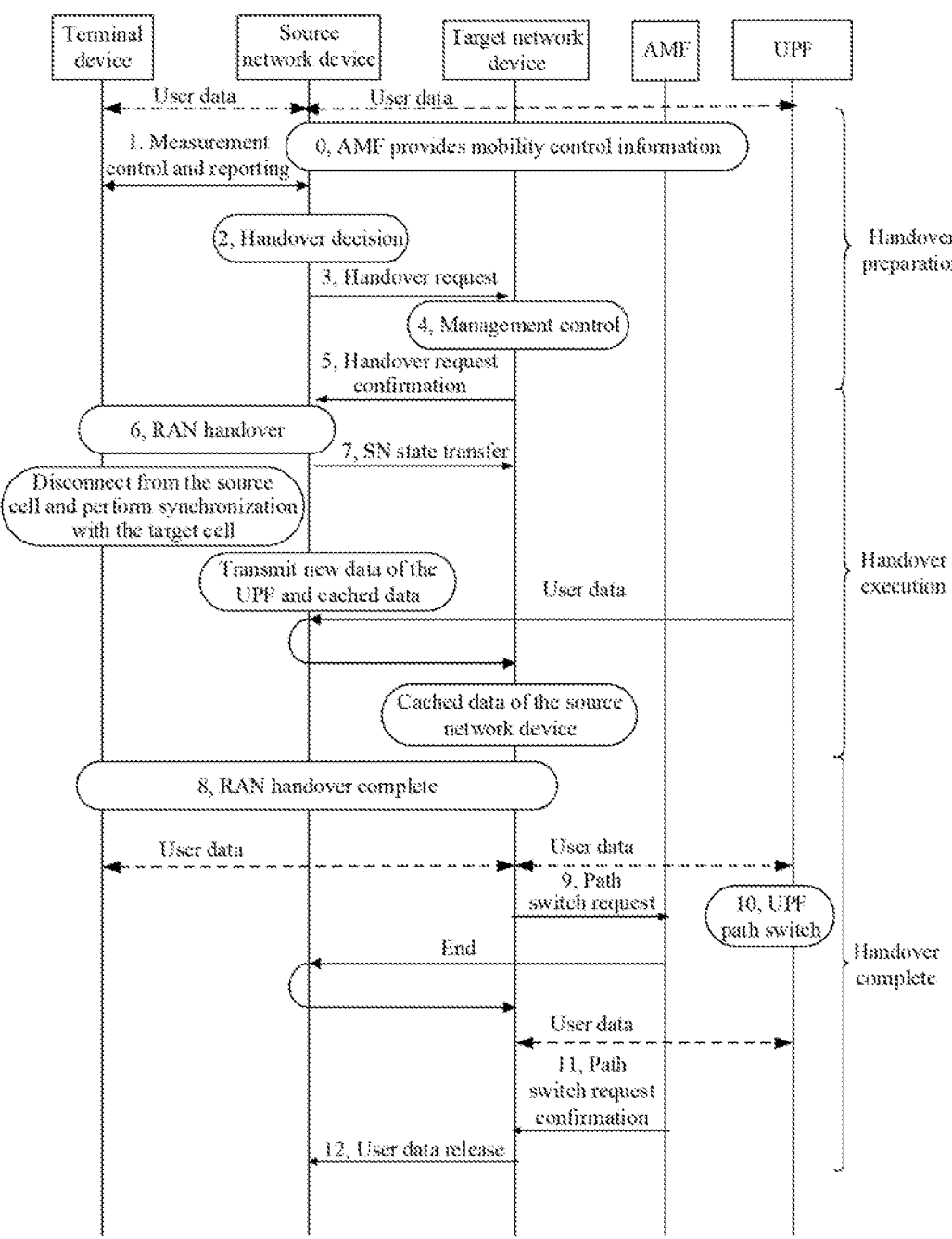
FIG. 4 is a diagram of a handover process.

The handover preparation stage: as illustrated in operations 0-5 of FIG. 4, a target network device and a source network device perform processing based on mobility control information provided by an Access and Mobility Management Function (AMF). The terminal device performs measurement control and reporting. The source network device makes a handover decision, and then the source network device sends a handover request to the target network device, the target network device performs management control and sends a handover request confirmation to the target network device. The handover confirmation message includes a handover command generated by the target cell. The source network device is not allowed to make any modification to the handover command generated by the target network device, and directly forwards the handover command to the terminal device.

The handover execution stage: as illustrated in operations 6-7 of FIG. 4, the terminal device immediately executes the handover process upon reception of the handover command. The handover process may include: Radio Access Network (RAN) handover is performed between the terminal device and the source network device, and the terminal disconnects from the source cell, and performs synchronization and establishes connection with the target cell (for example, performing random access, and sending an RRC handover complete message to the target base station); and Sequence Number (SN) state transfer. The handover process may also include that the source network device transmits new data of a User Plane Function (UPF), and transmits cached data to the target network device.

The handover complete stage: as illustrated in operations 8-12 of FIG. 4, after RAN handover is completed, user data is transmitted between the terminal device and the target network device and between the target network device and the UPF. Then, the target network device sends a path switch request to the AMF, the UPF executes path switch, and then the AMF notifies, through the source network device, the target network device that the path switch ends. The AMF sends a path switch request confirmation to the target network device, and then the target network device notifies the source network device to release the user data.

For a specific scenario (for example, the target cell may determine that Timing Advance (TA) of the terminal device to the source cell is the same as TA of the terminal device to the target cell, or the TA of the UE to the target cell is 0), the Random Access Channel-less Handover (RACH-less HO) different from the aforementioned handover process may specifically include the following operations. The target cell (the target network device) may configure RACH-skip information in a handover command transmitted by the source network device. That is, the handover process may be RACH-less HO. The RACH-skip information may include uplink resource(s), used by the terminal device to access the target cell, for the terminal device to transmit a handover complete message. If no uplink resource is configured in the handover command, the terminal device needs to perform monitoring of a PDCCH of the target cell and wait for the target cell to schedule uplink transmission, and transmits the handover complete message on a scheduled uplink resource.

In RACH-less HO, the uplink resource configuration (ul-ConfigInfo) may include the following contents.

```
ul-ConfigInfo-r14                SEQUENCE {
  numberOfConfUL-Processes-r14     INTEGER (1..8),
  ul-SchedInterval-r14             ENUMERATED {sf2, sf5, sf10},
  ul-StartSubframe-r14             INTEGER (0..9),
  ul-Grant-r14                     BIT STRING (SIZE (16))
}.
```

Herein, numberOfConfUL-Processes represents the number of HARQ processes available for the uplink resource, ul-SchedInterval represents a time interval between UL grants, ul-StartSubFrame represents a start sub-frame number of the uplink grant, and ul-Grant represents a PUSCH resource.

For RACH-less HO, in an NR terrestrial network, a propagation delay between a terminal device and the network is relatively short, and a delay required for a target cell to correctly send a handover command to the terminal device through forwarding of a source cell (namely including an X2 delay, plus a delay from reception of the handover command by the source cell to forwarding of the handover command by the source cell, plus a propagation delay of a Uu interface of the source cell) is not long. Based on the delay information, the target cell may reasonably configure a time-domain position of an uplink resource in the handover command during RACH-less HO, for the UE to transmit an RRCReconfigurationComplete message (i.e., a handover complete message) when accessing the target cell.

Compared with the cellular network used by conventional NR, in the NTN, the propagation delay between the terminal device and the satellite is relatively long. For the delay of the handover command from the target cell to the terminal device, an air interface propagation delay of correct reception of the handover command by the UE may vary within a large range because of Radio Link Control (RLC) retransmission or HARQ retransmission at the source cell side during forwarding of the handover command by the source cell. As a result, this brings a great challenge to the target cell in configuring the time-domain position of the uplink resource in the RACH-less handover command. If the terminal device correctly receives the handover command after multiple RLC retransmissions or multiple HARQ retransmissions at the source cell side, the time for the terminal device to access the target cell will be delayed.

In addition, the uplink resource in the handover command is relatively small in size, and is mainly used for the terminal device to report the handover complete message and not suitable for uplink transmission of ordinary data. After the handover complete message is reported successfully, the network needs to reclaim the resource (that is, the terminal device needs to release the resource) for subsequent scheduled transmission of other data. Otherwise, the resource will be wasted.

Based on this, the method for releasing the uplink resource provided in the disclosure is described in combination with the following examples.

First Example

After a handover complete message is transmitted through an uplink grant resource, the terminal device releases the uplink grant resource upon determining that the handover complete message is transmitted successfully. In this example, the terminal device determines based on a preset condition that the handover complete message is transmitted successfully, and further determines to release the uplink grant resource. The preset condition may include at least one of: an uplink timer expires, or, a first downlink channel for scheduling an uplink transmission resource for new transmission is monitored.

A specific implementation process of this example is described below with reference to FIG. 5.

In an operation 51, the terminal device, when transmitting the handover complete message, starts the uplink timer, and performs monitoring of the first downlink channel and a second downlink channel.

Herein, the handover complete message is transmitted through the uplink grant (UL grant) resource. The UL grant resource is configured for the terminal device through a handover command.

The first downlink channel is a PDCCH scrambled with a Cell-Radio Network Temporary Identifier (C-RNTI). The second downlink channel is a PDCCH scrambled with a Configured Scheduling-Radio Network Temporary Identifier (CS-RNTI).

That is, the terminal device, upon transmitting the handover complete message based on the UL grant, starts the uplink timer, and starts performing monitoring of the PDCCH scrambled with the CS-RNTI and the PDCCH scrambled with the C-RNTI.

It is to be noted that at a network device side, the network device transmits at least one of the first downlink channel for scheduling the uplink transmission resource for new transmission or the second downlink channel for scheduling an uplink transmission resource for retransmission.

That is, if the network device needs the terminal device to perform retransmission, the network device may schedule the uplink transmission resource and indicate retransmission through the second downlink channel. If the network device has received the handover complete message transmitted by the terminal device, the network device may schedule the uplink transmission resource and indicate new transmission through the first downlink channel.

On this basis, one of an operation 52, an operation 53, or an operation S54 is performed.

In the operation 52, in case that the second downlink channel for scheduling the uplink transmission resource for retransmission is monitored, the terminal device performs retransmission based on the uplink resource scheduled by the second downlink channel, and restarts the uplink timer.

For example, if the terminal device receives the PDCCH scrambled with the CS-RNTI for scheduling uplink transmission and instructing to schedule retransmission, the terminal device performs retransmission by use of the scheduled uplink resource, and restarts the uplink timer.

After the operation 52 is performed, there may be two processes.

In one process, no first downlink channel is detected after the operation 52 is performed. In such case, the operation 54 is performed directly.

In another process, the first downlink channel is detected after the operation 52 is performed. In such case, the operation 53 is performed.

In the operation 53, in case that the first downlink channel for scheduling the uplink transmission resource for new transmission is monitored, the terminal device determines that the handover complete message is correctly received by the network device, and releases the uplink grant resource.

That is, the terminal device, if receiving the PDCCH scrambled with the C-RNTI for scheduling the uplink transmission (for example, a New Data Indicator (NDI) field in the PDCCH may be set to 1), determines that the handover complete message is correctly received by the network. In such case, the terminal device releases a configured RACH-skip resource (i.e., the UL grant resource).

It should be noted that the operation 53 may be performed after the operation 51 or the operation 52.

If the terminal device, after transmitting the handover complete message, monitors no second downlink channel but only the first downlink channel for scheduling the uplink transmission resource for new transmission, then the operation 53 is performed directly after the operation 51.

If the terminal device, after transmitting the handover complete message, monitors the second downlink channel for scheduling the uplink transmission resource for retransmission; and after performing retransmission of data and restarting the timer, monitors the first downlink channel for scheduling the uplink transmission resource for new transmission, then the operation 52 is performed after the operation 51 and then the operation 53 is further performed.

So far, no matter whether the operation 53 is performed directly after the operation 51 or the operations 52 and 53 are sequentially performed after the operation 51, as long as the process proceeds to the operation 53, it is considered that the preset condition is met: the first downlink channel for scheduling the uplink transmission resource for new transmission is monitored. In such case, the terminal device may determine that the handover complete message is correctly received by the network device. Therefore, the terminal device may release the uplink grant resource, and the process ends.

In addition, the method may further include that in case that the uplink timer is running when the uplink grant resource is released, the terminal device stops the uplink timer.

That is, if the terminal device determines that the handover complete message is correctly received by the network device and releases the uplink grant resource in the operation 53, timing of the uplink timer is no long required to be maintained. Therefore, if the uplink timer is still running after the operation 53 is performed, the uplink timer is stopped.

In the operation 54, in case that the uplink timer expires, the terminal device determines that the handover complete message is correctly received by the network device, and releases the uplink grant resource.

That is, in case that the uplink timer expires, the terminal device determines that the handover complete message is correctly received by the network. In such case, the terminal device releases the configured RACH-skip resource (i.e., the UL grant resource).

Here, the operation 54 may be performed after the operation 51 or the operation 52.

In one situation, if the operation 51 is performed, i.e., the terminal device neither receives the first downlink channel nor the second downlink channel after transmitting the handover complete message on the UL grant resource, then it is determined whether the uplink timer expires. In case that the uplink timer expires (i.e., the preset condition is met), it may be determined that the handover complete message is correctly received by the network device, and the uplink grant resource is released directly.

In the other situation, if the operation 51 is performed, i.e., the terminal device does not receive the first downlink channel but receives the second downlink channel after transmitting the handover complete message on the uplink grant resource, then the operation 52 may be performed. After uplink retransmission is performed and the uplink timer is restarted, the operation 54 is performed to determine whether the uplink timer expires. In case that the uplink timer expires (i.e., the preset condition is met), it may be determined that the handover complete message is correctly received by the network device, and the uplink grant resource is released directly.

In the other situation, there is also such a possibility that the terminal device may receive the second downlink channel for many times. That is, the second downlink channel for scheduling the uplink transmission resource for retransmission may be monitored again before the restarted uplink timer does not expire (or during running of the restarted uplink timer), and in such case, the operation 52 is performed again to perform retransmission based on the scheduled uplink transmission resource and restart the uplink timer. Such operations are performed repeatedly.

According to the solution provided in this example, it can be understood that after the handover complete message is transmitted based on the UL grant, the terminal device releases the uplink grant resource after determining that the message is transmitted successfully. A condition of determining successful transmission may be: the timer expires or the PDCCH scrambled with the C-RNTI for scheduling uplink transmission (new transmission) is received.

Figure 6:
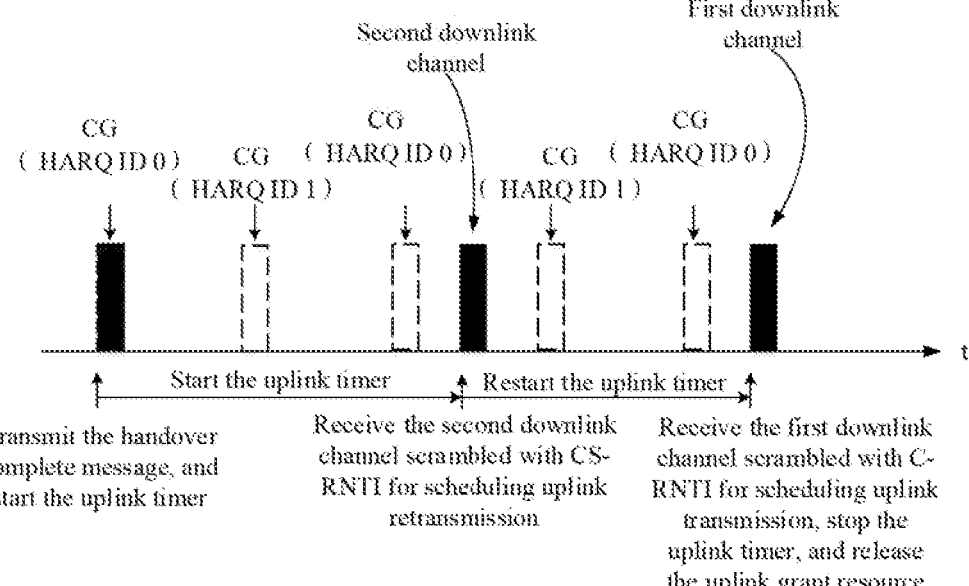
FIG. 6 is a first diagram of a scenario in which an uplink resource is released according to an embodiment of the disclosure.

A situation provided in this example is described with reference to FIG. 6. The terminal device starts the uplink timer when the terminal device transmits the handover complete message on the UL grant resource, that is, transmitting the handover complete message through a HARQ process with HARQ process ID 0 (i.e., HARQ ID is 0) for the CG in FIG. 6. If the second downlink channel is monitored (i.e., the PDCCH scrambled with the CS-RNTI for scheduling uplink retransmission is received) during running of the uplink timer, the uplink timer is restarted. If the first downlink channel is monitored (i.e., the terminal device receives the PDCCH scrambled with the C-RNTI for scheduling uplink transmission (new transmission)) during running of the restarted uplink timer, the uplink timer is stopped, and the UL grant resource is released.

According to the solution provided in this example, the handover complete message is transmitted through the UL grant resource configured in the handover command, in case that new scheduling is received from the network device or the uplink timer expires, the terminal device may determine that the transmitted handover complete message is correctly received by the network and release the pre-configured UL grant resource. The released pre-configured UL grant resource may be reclaimed by the network device for scheduling other data transmission or reconfiguring a pre-configured UL resource of a different size. In such way, resource waste is avoided.

Second Example

Unlike the first example, the preset condition used in this example is: indication information for instructing to release the uplink grant resource is received. That is, in this example, the terminal device needs to receive explicit indication information transmitted by the network device, where the indication information is used to instruct the terminal device to release the uplink grant resource pre-configured in the handover command.

Figure 7:
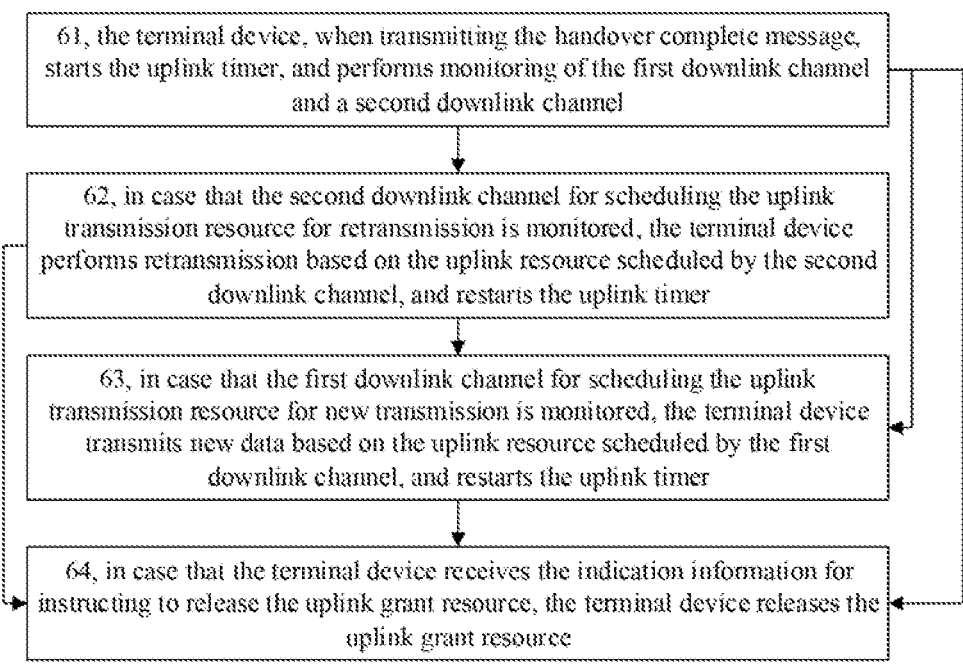
FIG. 7 is a fourth flowchart of a method for releasing an uplink resource according to an embodiment of the disclosure.

A specific implementation process of this example is described below with reference to FIG. 7.

In an operation 61, the terminal device, when transmitting the handover complete message, starts the uplink timer, and performs monitoring of the first downlink channel and a second downlink channel.

In an operation 62, in case that the second downlink channel for scheduling an uplink transmission resource for retransmission is monitored, the terminal device performs retransmission based on the uplink resource scheduled by the second downlink channel, and restarts the uplink timer.

The operations 61 and 62 may be understood as that the terminal device, upon transmitting the handover complete message based on the UL grant, starts the uplink timer and starts performing monitoring of the PDCCH scrambled with the CS-RNTI and the PDCCH scrambled with the C-RNTI. If the terminal device receives the PDCCH scrambled with the CS-RNTI for scheduling uplink retransmission and instructing to schedule retransmission, the terminal device performs retransmission by use of the scheduled uplink resource, and restarts the uplink timer.

In addition, specific descriptions about the operation 61 to the operation 62 are the same as those about the operation 51 to the operation 52 in the first example, and elaborations are omitted.

The operation 61 is the same as the operation 51 in that any one of the operation 62, an operation 63, and an operation 64 may be performed based on actually received information after the operation 61 is performed.

The operation 62 is the same as the operation 52 in that after the operation 62 is performed, there may be two processes.

In one process, no first downlink channel is detected after the operation 62 is performed. In such case, the operation 64 is performed directly.

In another process, the first downlink channel is detected after the operation 62 is performed. In such case, the operation 63 is performed.

There is another process that, after the operation 62 is performed, no first downlink channel is detected but the second downlink channel is detected again. In such case, the operation 62 may be performed again.

In the operation 63, in case that the first downlink channel for scheduling the uplink transmission resource for new transmission is monitored, the terminal device transmits new data based on the uplink resource scheduled by the first downlink channel, and restarts the uplink timer.

That is, if the terminal device receives the PDCCH scrambled with the CS-RNTI for scheduling uplink transmission and instructing to schedule retransmission, the terminal device performs retransmission by use of the scheduled uplink resource, and restarts the uplink timer.

The operation 63 is different from the operation 53 in first example in that when the first downlink channel for scheduling the uplink transmission resource for new transmission is received, it is not determined that the handover complete message has been correctly received by the network device, and instead, the uplink timer is restarted to continue waiting, and the operation 64 is performed.

In the operation 64, in case that the terminal device receives the indication information for instructing to release the uplink grant resource, the terminal device releases the uplink grant resource.

Specifically, if the terminal device receives, from the network side, explicit indication information for instructing the terminal device to release the uplink grant resource pre-configured in the handover command, the terminal device releases the uplink grant resource pre-configured in the handover command based on the indication from the network.

That is, only when the terminal device receives the indication information for instructing to release the uplink grant resource, the terminal device may determine that the preset condition is met, and determine to release the uplink grant resource.

Further, the indication information is carried in at least one of: a Media Access Control (MAC) Control Element (CE), RRC signaling, or a PDCCH.

If the indication information is carried by RRC signaling, the RRC signaling may be an RRC reconfiguration message.

If the indication information is carried by MAC signaling, the MAC signaling may be of a new MAC CE format.

If the indication information is carried by PDCCH signaling, the indication information may be indicated by one bit in Downlink Control Information (DCI). A value of the bit may be predefined. For example, the value of the bit is a first value, which indicates release of the uplink grant resource; and the value of the bit is a second value, which does not indicate release of the uplink grant resource. The first value may be 1, and the second value may be 0. Or, the first value may be 0, and the second value may be 1. Exhaustions are omitted herein.

It is to be noted that if the terminal device receives the indication information carried by one of the above information but the indication information is not used for instructing the terminal device to release the uplink grant resource pre-configured in the handover command, then the preset condition is not met. In such case, the terminal device may continue to determine, based on subsequently received information, to perform one of the operation 62, the operation 63, or the operation 64 again. For example, if the terminal device monitors the first downlink channel, the operation 63 may be performed. If the terminal device monitors the second downlink channel, the operation 62 may be performed. If the terminal device monitors the indication information again, the operation 64 is performed, and so on.

In addition, in case that the uplink timer is running when the uplink grant resource is released, the terminal device stops the uplink timer. That is, the uplink timer is stopped if the uplink timer is still running after the operation 64 is performed.

Figure 8:
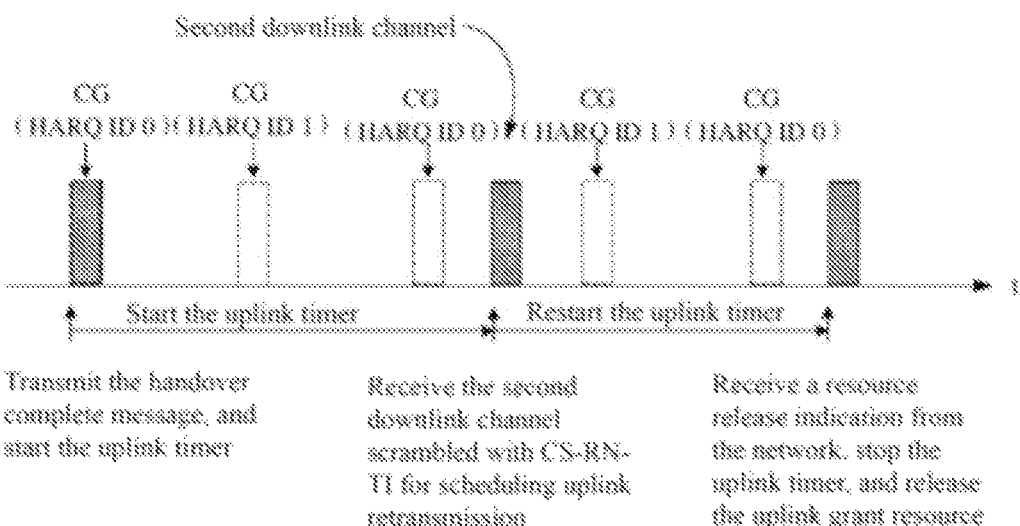
FIG. 8 is a second diagram of a scenario in which an uplink resource is released according to an embodiment of the disclosure.

A situation provided in this example is described with reference to FIG. 8. The terminal device restarts the uplink timer when terminal device transmits the handover complete message on the UL grant resource, namely transmitting the handover complete message through a HARQ process with HARQ process ID 0 (i.e., HARQ ID is 0) for the CG in FIG. 8. If the second downlink channel is monitored (i.e., the PDCCH scrambled with the CS-RNTI for scheduling uplink retransmission is received) during running of the uplink timer, the uplink timer is restarted. If a resource release indication/instruction is received from the network during running of the restarted uplink timer, the uplink timer is stopped, and the UL grant resource is released.

The solution provided in this example is different from that provided in the first example in that an explicit release instruction is introduced in this example. That is, the network may instruct the terminal device to release the resource only when correctly receiving the handover complete message, which has better reliability.

Based on the above, how to determine a position of the UL grant resource for transmitting the handover complete message will be described below in detail.

Figure 9:
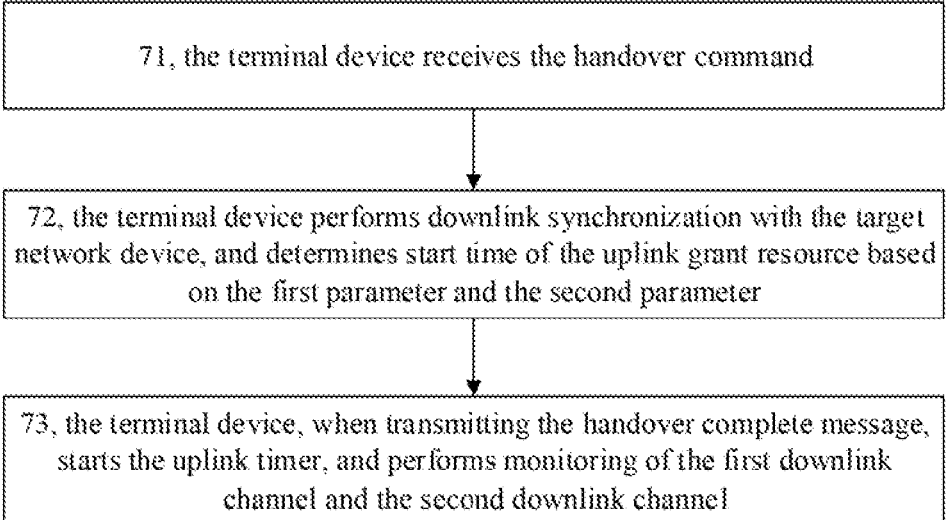
FIG. 9 is a flowchart of a process for determining start time of an uplink grant resource according to an embodiment of the disclosure.

For a handover scenario (such as an NTN scenario) with a relatively long propagation delay, according to the solution provided in the embodiment, start System Frame Number (SFN) information, the CS-RNTI, and information related to the uplink timer for UL grant transmission are introduced into the uplink resource configuration in the handover command. Specific descriptions will be made below with reference to FIG. 9.

In an operation 71, the terminal device receives the handover command.

Correspondingly, when the network device is a target network device in the present handover process of the terminal device, the network device generates the handover command, and forwards the handover command to the terminal device through a source network device.

When the network device is the source network device in the present handover process of the terminal device, the network device receives the handover command from the target network device, and transmits the handover command to the terminal device.

The handover command includes RACH-skip information. The RACH-skip information is used to indicate the UL grant resource.

The RACH-skip information includes at least one of: a first parameter representing a start radio frame of the UL grant resource, which may be represented as ul-StartRadioFrame; a second parameter representing a start sub-frame of the UL grant resource, which may be represented as ul-StartSubframe; a duration parameter of the uplink timer; CS-RNTI information; a third parameter representing a number of HARQ processes available for the UL grant resource, which may be represented as numberOfConfUL-Processes; a time interval between adjacent UL grant resources, which may be represented as ul-SchedInterval; or a time-frequency resource position of the UL grant resource, which may be represented as a time-frequency position of a PUSCH resource.

In an operation 72, the terminal device performs downlink synchronization with the target network device, and determines start time of the UL grant resource based on the first parameter and the second parameter.

That is, the terminal device, after receiving the handover command, performs downlink synchronization with the target cell, and determines the start time of the UL grant (UL grant resource) based on ul-StartRadioFrame and ul-StartSubFrame.

Based on the above, in the embodiment, the position of the UL grant resource for transmitting the handover complete message may be determined in the following manner.

In case that time of completion of the downlink synchronization is not later than the start time of the UL grant resource, the handover complete message is transmitted on a first available UL grant resource.

In case that the time of completion of the downlink synchronization is later than the start time of the UL grant resource, the handover complete message is transmitted on a first available UL grant resource after the time of completion of the downlink synchronization.

Figure 10:
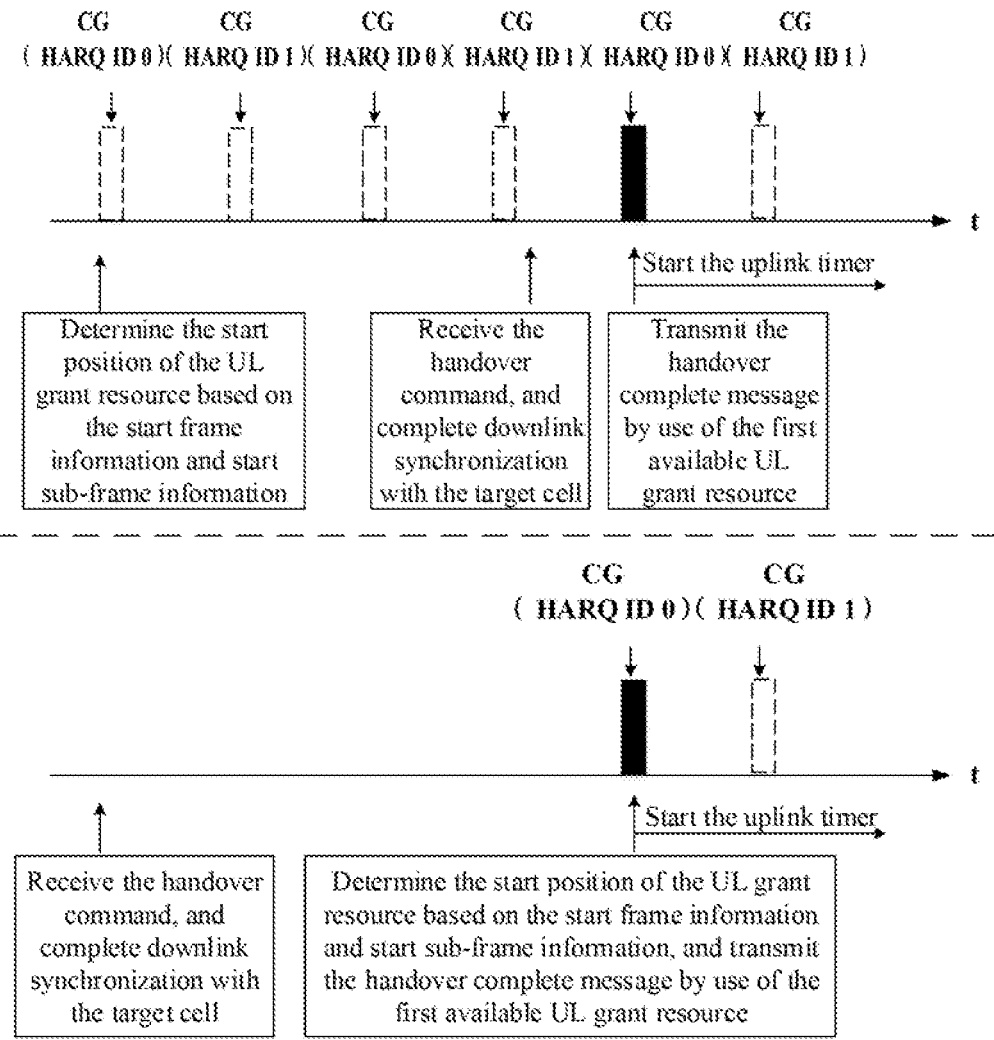
FIG. 10 is a diagram of a scenario involving a process for determining start time of an uplink grant resource according to an embodiment of the disclosure.

With reference to FIG. 10, the upper half in FIG. 10 illustrates that: if the handover command is received and the time of completion of the downlink synchronization with the target cell is later than the start time of the UL grant (i.e., the start position of the UL grant resource is determined based on the start frame information and start sub-frame information), the terminal device transmits the handover complete message by use of the first available UL grant resource after the downlink synchronization. In addition, the uplink timer may be started upon transmitting the handover complete message.

The lower half in FIG. 10 illustrates that: if the handover command is received and the time of completion of the downlink synchronization with the target cell is not later than the start time of the UL grant (i.e., the start position of the UL grant resource is determined based on the start frame information and start sub-frame information), the terminal device transmits the handover complete message by use of the first available UL grant resource in the RACH-skip information. In addition, the uplink timer may be started upon transmitting the handover complete message.

Further, in combination with the above first and second examples, it may further include an operation 73: the terminal device, when transmitting the handover complete message, starts the uplink timer, and performs monitoring of the first downlink channel and the second downlink channel.

That is, the terminal device, after transmitting the handover complete message on the UL grant resource, starts the uplink timer, and starts performing monitoring of the PDCCH scrambled with the CS-RNTI (i.e., the second downlink channel) for scheduling UL retransmission and the PDCCH scrambled with the C-RNTI (i.e., the first downlink channel) for scheduling UL new transmission. Then, the solution of the first example or the second example may be performed. Repetitive descriptions are omitted.

With the above-mentioned method, for a scenario with a long propagation delay, the position of the UL grant resource cannot be determined accurately only based on a start sub-frame, so start frame information may be introduced to determine the start time-domain position of the UL grant resource in combination with the start sub-frame, so that the terminal device may find the first available UL resource.

It can be seen that with the above-mentioned solution, the terminal device, after transmitting the handover complete message in the first type of handover process, may determine when to release the UL grant resource based on the preset condition. Therefore, the problem of resource waste caused by the situation that the UL grant resource configured to transmit the handover complete message is occupied all the time is avoided.

Figure 11:
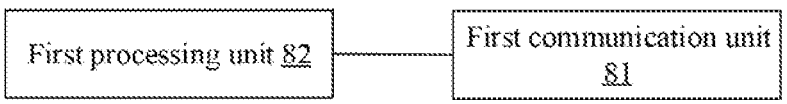
FIG. 11 is a structure diagram of composition of a terminal device according to an embodiment of the disclosure.

An embodiment of the disclosure provides a terminal device, as illustrated in FIG. 11. The terminal device includes a first communication unit 81 and a first processing unit 82.

The first communication unit 81 is configured to transmit an HO complete message through a UL grant resource in a first type of HO.

The first processing unit 82 is configured to release the UL grant resource in case that a preset condition is met. The UL grant resource is a UL resource, configured in an HO command, for accessing a target network device.

The preset condition includes at least one of: a UL timer expires, a first downlink channel for scheduling a UL transmission resource for new transmission is monitored, or indication information for instructing to release the UL grant resource is received.

Figure 12:
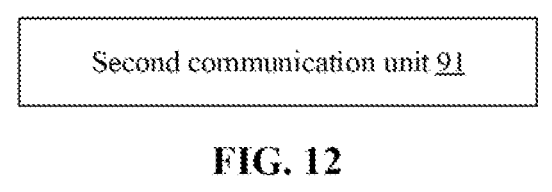

An embodiment of the disclosure further provides a network device, as illustrated in FIG. 12. The network device includes a second communication unit 91.

The second communication unit 91 is configured to receive an HO complete message transmitted by a terminal device through a UL grant resource in a first type of HO, and reclaim the UL grant resource released by the terminal device. The UL grant resource is a UL resource, configured for the terminal device in an HO command, for accessing a target network device.

The embodiments of the disclosure may be applied to an NTN. Certainly, the solutions of the embodiments are not limited to being applicable only to the NTN scenario, and may also be applied to other communication scenarios (such as NR and LTE). Correspondingly, the network device may be a base station (such as a gNB or an eNB) in a terrestrial communication network, or a satellite in the NTN.

The UL resource release process provided in the disclosure is described with reference to the following examples.

First Example

After an HO complete message is transmitted through a UL grant resource, the terminal device releases the UL grant resource after determining that the HO complete message is transmitted successfully. In this example, the terminal device determines based on a preset condition that the HO complete message is transmitted successfully, and further determines to release the UL grant resource. The preset condition may include at least one of: a UL timer expires, or, a first downlink channel for scheduling a UL transmission resource for new transmission is monitored.

The first processing unit 82 is configured to, when the first communication unit 81 of the terminal device transmits the HO complete message, start the UL timer, and perform monitoring of the first downlink channel and a second downlink channel.

The HO complete message is transmitted through the UL grant resource. The UL grant resource is configured for the terminal device through an HO command.

The first downlink channel is a PDCCH scrambled with a C-RNTI. The second downlink channel is a PDCCH scrambled with a CS-RNTI.

The first communication unit 81 of the terminal device is configured to, in case that the second downlink channel for scheduling a UL transmission resource for retransmission is monitored, perform retransmission based on the UL resource scheduled by the second downlink channel.

The first processing unit 82 is configured to restart the UL timer.

The first processing unit 82 of the terminal device is configured to, in case that the first communication unit 81 monitors the first downlink channel for scheduling the UL transmission resource for new transmission, determine that the HO complete message is correctly received by the network device, and release the UL grant resource.

The first processing unit 82 is configured to, in case that the UL timer expires, determine that the HO complete message is correctly received by the network device, and release the UL grant resource. Herein, the first processing unit releases the UL grant resource may include that the first processing unit controls the first communication unit to release the UL grant resource.

The first processing unit is configured to stop the UL timer in case that the UL timer is running when the UL grant resource is released.

With the solution provided in this example, after the HO complete message is transmitted through the UL grant resource configured in the HO command, in case that new scheduling is received from the network device or the UL timer expires, the terminal device may determine that the transmitted HO complete message is correctly received by the network and release the pre-configured UL grant resource. The released pre-configured UL grant resource may be reclaimed by the network device for scheduling other data transmission or reconfiguring a pre-configured UL resource of a different size. In such way, resource waste is avoided.

Second Example

Unlike the first example, the preset condition used in this example is: indication information for instructing to release the UL grant resource is received. That is, in this example, the terminal device needs to receive explicit indication information transmitted by the network device, where the indication information is used to instruct the terminal device to release the UL grant resource pre-configured in the HO command.

The processes of transmitting the HO complete message, starting the UL timer, and performing monitoring of the second downlink channel are the same as those in the first example, and will not be elaborated.

This example is different from the first example in that: the first communication unit is configured to, in case that the first downlink channel for scheduling the UL transmission resource for new transmission is monitored, transmit new data based on the UL resource scheduled by the first downlink channel.

The first processing unit is configured to restart the UL timer.

The first processing unit 82 is configured to release the UL grant resource in case that the first communication unit receives the indication information for instructing to release the UL grant resource.

The indication information is carried in at least one of: a MAC CE, RRC signaling, or a PDCCH.

In addition, the first processing unit 82 is configured to stop the UL timer in case that the UL timer is running when the UL grant resource is released.

The solution provided in this example is different from that provided in the first example in that an explicit release instruction is introduced in this example. That is, the network may instruct the terminal device to release the resource only when correctly receiving the handover complete message, which has better reliability.

Based on the above, how to determine a position of the UL grant resource for transmitting the HO complete message will be described below in detail.

For an HO scenario (such as an NTN scenario) with a relatively long propagation delay, according to the solution provided in the embodiment, start SFN information, the CS-RNTI, and information related to the UL timer for UL grant transmission are introduced into the UL resource configuration in the HO command.

The first communication unit 81 of the terminal device is configured to receive the HO command.

Correspondingly, when the network device is a target network device in the present HO process of the terminal device, the network device generates the HO command, and the second communication unit 91 of the network device is configured to forward the HO command to the terminal device through a source network device.

When the network device is the source network device in the present HO process of the terminal device, the second communication unit 91 of the network device is configured to receive the HO command from the target network device, and transmit the HO command to the terminal device.

The HO command includes RACH-skip information. The RACH-skip information is used to indicate the UL grant resource.

The RACH-skip information includes at least one of: a first parameter representing a start radio frame of the UL grant resource, which may be represented as ul-StartRadioFrame; a second parameter representing a start sub-frame of the UL grant resource, which may be represented as ul-StartSubframe; a duration parameter of the UL timer; CS-RNTI information; a third parameter representing a number of Hybrid Automatic Repeat reQuest (HARQ) processes available for the UL grant resource, which may be represented as numberOfConfUL-Processes; a time interval between adjacent UL grant resources, which may be represented as ul-SchedInterval; or a time-frequency resource position of the UL grant resource, which may be represented as a time-frequency position of a PUSCH resource.

The first processing unit of the terminal device is configured to perform downlink synchronization with the target network device, and determine start time of the UL grant resource based on the first parameter and the second parameter.

Based on the above, in the embodiment, the position of the UL grant resource for transmitting the HO complete message may specifically be determined in the following manner.

The first processing unit is configured to: control, in case that time of completion of the downlink synchronization is not later than the start time of the UL grant resource, the first communication unit to transmit the HO complete message on a first available UL grant resource; and control, in case that the time of completion of the downlink synchronization is later than the start time of the UL grant resource, the first communication unit to transmit the HO complete message on a first available UL grant resource after the time of completion of the downlink synchronization.

It can be seen that with the above-mentioned solution, the terminal device, after transmitting the HO complete message in the first type of HO process, may determine when to release the UL grant resource based on preset condition. Therefore, the problem of resource waste caused by the situation that the UL grant resource configured to transmit the HO complete message is occupied all the time is avoided.

Figure 13:
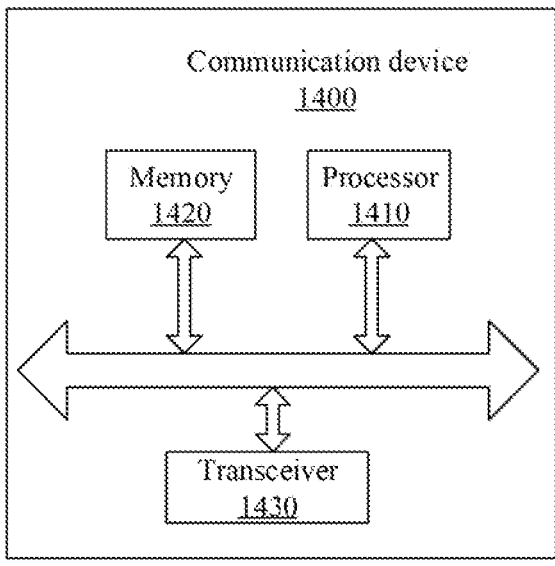
FIG. 13 is a structure diagram of composition of a communication device according to an embodiment of the disclosure.

FIG. 13 is a structure diagram of a communication device 1400 according to an embodiment of the disclosure. The communication device in the embodiment may specifically be the terminal device or network device in the above-mentioned embodiments. The communication device 1400 illustrated in FIG. 13 includes a processor 1410. The processor 1410 is configured to call and run a computer program in a memory to implement the methods in the embodiments of the disclosure.

Optionally, as illustrated in FIG. 13, the communication device 1400 may further include a memory 1420. The processor 1410 is configured to call and run the computer program in the memory 1420 to implement the methods in the embodiments of the disclosure.

The memory 1420 may be a separate device independent of the processor 1410, or may be integrated into the processor 1410.

Optionally, as illustrated in FIG. 13, the communication device 1400 may further include a transceiver 1430. The processor 1410 is configured to control the transceiver 1430 to communicate with another device, specifically sending information or data to the other device or receiving information or data sent by the other device.

The transceiver 1430 may include a transmitter and a receiver. The transceiver 1430 may further include antennae. The number of the antennae may be one or more.

Optionally, the communication device 1400 may specifically implement corresponding flows implemented by the terminal device or network device in the embodiments of the disclosure. For brevity, elaborations are omitted herein.

Figure 14:
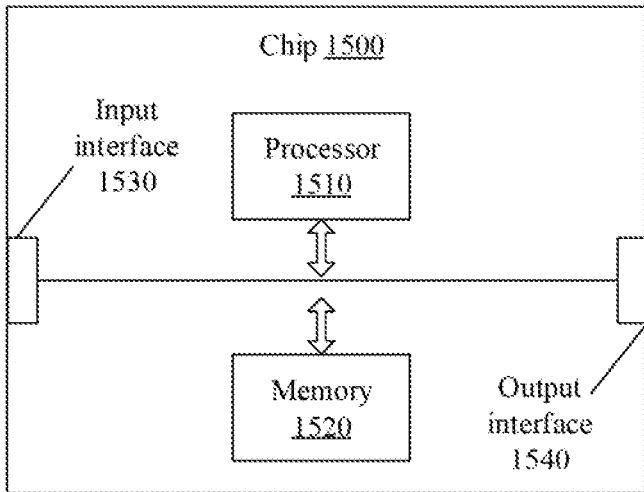
FIG. 14 is a block diagram of a chip according to an embodiment of the disclosure.

FIG. 14 is a structure diagram of a chip according to an embodiment of the disclosure. The chip 1500 illustrated in FIG. 14 includes a processor 1510. The processor 1510 is configured to call and run a computer program in a memory to implement the methods in the embodiments of the disclosure.

Optionally, as illustrated in FIG. 14, the chip 1500 may further include a memory 1520. The processor 1510 is configured to call and run the computer program in the memory 1520 to implement the methods in the embodiments of the disclosure.

The memory 1520 may be a separate device independent of the processor 1510, or may be integrated into the processor 1510.

Optionally, the chip 1500 may further include an input interface 1530. The processor 1510 is configured to control the input interface 1530 to communicate with another device or chip, specifically acquiring information or data sent by the other device or chip.

Optionally, the chip 1500 may further include an output interface 1540. The processor 1510 is configured to control the output interface 1540 to communicate with another device or chip, specifically sending information or data to the other device or chip.

Optionally, the chip may implement corresponding flows implemented by the terminal device or network device in the embodiments of the disclosure. For brevity, elaborations are omitted herein.

It is to be understood that the chip mentioned in the embodiment of the disclosure may also be referred to as a system-level chip, a system chip, a chip system, a system on chip, or the like.

It is to be understood that the processor in the embodiments of the disclosure may be an integrated circuit chip with a signal processing capacity. During implementation, each operation of the method embodiments may be completed by an integrated logical circuit in a hardware form in the processor or an instruction in a software form. The processor may be a general-purpose processor, a Digital Signal Processor (DSP), an Application Specific integrated Circuit (ASIC), a Field Programmable Gate Array (FPGA) or another programmable logic device, a discrete gate or transistor logic device, or a discrete hardware component or the like.

It can be understood that the memory in the embodiments of the disclosure may be a volatile memory or a nonvolatile memory, or may include both volatile and nonvolatile memories. It is to be noted that the memory of the system and method described herein is intended to include, but not limited to, memories of these and any other proper types.

It is to be understood that the memory is exemplarily but unlimitedly described. For example, the memory in the embodiments of the disclosure may also be a Static Random Access Memory (SRAM), a Dynamic RAM (DRAM), a Synchronous DRAM (SDRAM), a Double Data Rate SDRAM (DDR SDRAM), an Enhanced SDRAM (ES-DRAM), a Synch Link DRAM (SLDRAM), or a Direct Rambus RAM (DR RAM) or the like. That is, the memory in the embodiments of the disclosure is intended to include, but not limited to, memories of these and any other proper types.

Figure 15:
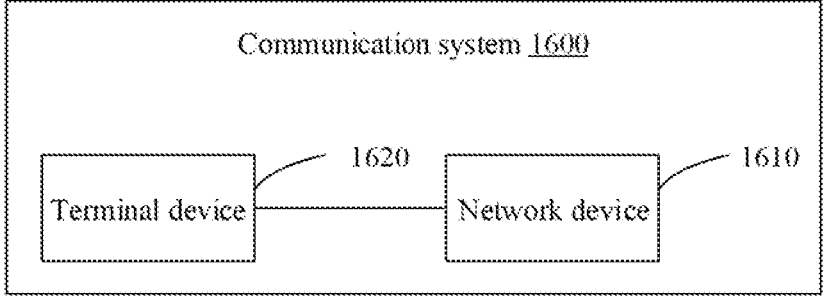
FIG. 15 is a second diagram of architecture of a communication system according to an embodiment of the disclosure.

FIG. 15 is a block diagram of a communication system 1600 according to an embodiment of the disclosure. As illustrated in FIG. 15, the communication system 1600 includes a network device 1610 and a terminal device 1620.

The network device 1610 may be configured to realize corresponding functions realized by the network device in the methods. The terminal device 1620 may be configured to realize corresponding functions realized by the terminal device in the methods. For brevity, elaborations are omitted herein.

An embodiment of the disclosure also provides a computer-readable storage medium, which is configured to store a computer program.

Optionally, the computer-readable storage medium may be applied to the network device or satellite or terminal device in the embodiments of the disclosure. The computer program causes a computer to execute corresponding flows implemented by the network device or the terminal device in each method of the embodiments of the disclosure. For brevity, elaborations are omitted herein.

An embodiment of the disclosure also provides a computer program product, which includes a computer program instruction.

Optionally, the computer program product may be applied to the network device or satellite or terminal device in the embodiments of the disclosure. The computer program instruction causes a computer to execute corresponding flows implemented by the network device or the terminal device in each method of the embodiments of the disclosure. For brevity, elaborations are omitted herein.

An embodiment of the disclosure also provides a computer program.

Optionally, the computer program may be applied to the network device or satellite or terminal device in the embodiments of the disclosure, and when being run on a computer, causes the computer to execute corresponding flows implemented by the network device or terminal device in each method of the embodiments of the disclosure. For brevity, elaborations are omitted herein.

Those of ordinary skill in the art may realize that the units and algorithm operations of each example described in combination with the embodiments disclosed in the disclosure may be implemented by electronic hardware or a combination of computer software and electronic hardware. Whether these functions are executed by hardware or software depends on specific applications and design constraints of the technical solutions. Professionals may realize the described functions for each specific application by use of different methods, but such realization shall fall within the scope of the disclosure.

Those skilled in the art may clearly know that for specific working processes of the system, device, and unit described above, the reference may be made to the corresponding processes in the method embodiments. Thus, these specific working processes will not be elaborated herein for ease and brevity of description.

In some embodiments provided by the disclosure, it is to be understood that the disclosed system, device, and method may be implemented in another manner. The units described as separate parts may or may not be physically separated. Parts displayed as units may or may not be physical units, namely they may be located in the same place, or may be distributed to multiple network units. Part or all of the units may be selected to achieve the objectives of the solutions of the embodiments as practically needed.

In addition, each function unit in each embodiment of the disclosure may be integrated into a processing unit. Alternatively, each unit may physically exist independently. Alternatively, two or more than two units may be integrated into a unit.

The function may be stored in a computer-readable storage medium when being realized in form of a software function unit and sold or used as an independent product. Based on such an understanding, the technical solutions of the disclosure substantially or parts making contributions to the conventional art or part of the technical solutions may be embodied in form of a software product. The computer software product is stored in a storage medium, including a plurality of instructions for causing a computer device (which may be a personal computer, a server, a network device, or the like) to execute all or part of the operations of the method in each embodiment of the disclosure. The above-mentioned storage medium includes various media capable of storing program codes, such as a U disk, a mobile hard disk, a Read-Only Memory (ROM), a RAM, a magnetic disk, or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for releasing an uplink resource, comprising:

transmitting, by a terminal device, a handover complete message through an uplink grant resource in a first type of handover; and releasing, by the terminal device, the uplink grant resource in case that a preset condition is met, wherein the uplink grant resource is an uplink resource, configured in a handover command, for accessing a target network device, and wherein the preset condition comprises at least one of: an uplink timer expires, a first downlink channel for scheduling an uplink transmission resource for new transmission is monitored, or indication information for instructing to release the uplink grant resource is received, the method further comprising:

starting, by the terminal device, when transmitting the handover complete message, the uplink timer, and performing monitoring of the first downlink channel and a second downlink channel for scheduling an uplink transmission resource for retransmission, wherein the first downlink channel is a Physical Downlink Control Channel (PDCCH) scrambled with a Cell-Radio Network Temporary Identifier (C-RNTI), and the second downlink channel is a PDCCH scrambled with a Configured Scheduling-Radio Network Temporary Identifier (CS-RNTI);

in case that the second downlink channel for scheduling the uplink transmission resource for retransmission is monitored, performing, by the terminal device, retransmission based on the uplink transmission resource scheduled by the second downlink channel, and restarting the uplink timer; and in case that the uplink timer expires, determining, by the terminal device, that the handover complete message is correctly received by a network device, and releasing the uplink grant resource.

2. The method of claim 1, wherein the first type of handover is Random Access Channel-less (RACH-less) handover.

3. The method of claim 1, further comprising:

in case that the first downlink channel for scheduling the uplink transmission resource for new transmission is monitored, determining, by the terminal device, that the handover complete message is correctly received by a network device, and releasing the uplink grant resource.

4. The method of claim 1, further comprising:

in case that the first downlink channel for scheduling the uplink transmission resource for new transmission is monitored, transmitting, by the terminal device, new data based on the uplink transmission resource scheduled by the first downlink channel, and restarting the uplink timer;

wherein releasing, by the terminal device, the uplink grant resource in case that the preset condition is met comprises:

in case that the terminal device receives the indication information for instructing to release the uplink grant resource, releasing the uplink grant resource, wherein the indication information is carried in at least one of: a Media Access Control (MAC) Control Element (CE), Radio Resource Control (RRC) signaling, or a Physical Downlink Control Channel (PDCCH).

5. The method of claim 4, further comprising:

in case that the uplink timer is running when the UL grant resource is released, stopping, by the terminal device, the uplink timer.

6. The method of claim 1, further comprising:

receiving, by the terminal device, the handover command, wherein the handover command comprises Random Access Channel (RACH) skip information for indicating the uplink grant resource, wherein the RACH skip information comprises at least one of:

a first parameter representing a start radio frame of the uplink grant resource;

a second parameter representing a start sub-frame of the uplink grant resource;

a duration parameter of the uplink timer;

CS-RNTI information;

a third parameter representing a number of Hybrid Automatic Repeat reQuest (HARQ) processes available for the uplink grant resource;

a time interval between adjacent uplink grant resources; or a time-frequency resource position of the uplink grant resource, wherein the method further comprises:

performing, by the terminal device, downlink synchronization with the target network device, and determining start time of the uplink grant resource based on the first parameter and the second parameter;

in case that time of completion of the downlink synchronization is not later than the start time of the uplink grant resource, transmitting the handover complete message on a first available uplink grant resource; and in case that the time of completion of the downlink synchronization is later than the start time of the uplink grant resource, transmitting the handover complete message on a first available uplink grant resource after the time of completion of the downlink synchronization.

7. A terminal device, comprising:

a processor;

a transceiver; and a memory is coupled with the transceiver and the processor, and is configured to store computer programs that, when executed by the processor, cause the processor to:

control the transceiver to transmit a handover complete message through an uplink grant resource in a first type of handover; and release the uplink grant resource in case that a preset condition is met, wherein the uplink grant resource is an uplink resource, configured in a handover command, for accessing a target network device, and wherein the preset condition comprises at least one of: an uplink timer expires, a first downlink channel for scheduling an uplink transmission resource for new transmission is monitored, or indication information for instructing to release the uplink grant resource is received, wherein the processor is configured to, when transmitting the handover complete message via the transceiver, start the uplink timer, and perform monitoring of the first downlink channel and a second downlink channel for scheduling an uplink transmission resource for retransmission, wherein the first downlink channel is a Physical Downlink Control Channel (PDCCH) scrambled with a Cell-Radio Network Temporary Identifier (C-RNTI), and the second downlink channel is a PDCCH scrambled with a Configured Scheduling-Radio Network Temporary Identifier (CS-RNTI);

in case that the second downlink channel for scheduling the uplink transmission resource for retransmission is monitored, control the transceiver to perform retransmission based on the uplink transmission resource scheduled by the second downlink channel, and restart the uplink timer; and in case that the uplink timer expires, determine that the handover complete message is correctly received by a network device and release the uplink grant resource.

8. The terminal device of claim 7, wherein the first type of handover is Random Access Channel-less (RACH-less) handover.

9. The terminal device of claim 7, wherein the processor is configured to, in case that the first downlink channel for scheduling the uplink transmission resource for new transmission is monitored, determine that the handover complete message is correctly received by a network device, and release the uplink grant resource.

10. The terminal device of claim 7, wherein the processor is configured to:

in case that the first downlink channel for scheduling the uplink transmission resource for new transmission is monitored, control the transceiver to transmit new data based on the uplink transmission resource scheduled by the first downlink channel, and restart the uplink timer; and in case that the indication information for instructing to release the uplink grant resource is received, release the uplink grant resource, wherein the indication information is carried in at least one of: a Media Access Control (MAC) Control Element (CE), Radio Resource Control (RRC) signaling, or a Physical Downlink Control Channel (PDCCH).

11. The terminal device of claim 10, wherein the processor is configured to stop the uplink timer in case that the uplink timer is running when the uplink grant resource is released.

12. The terminal device of claim 7, wherein the processor is configured to control the transceiver to receive the handover command, wherein the handover command comprises Random Access Channel (RACH) skip information for indicating the uplink grant resource, wherein the RACH skip information comprises at least one of:

a first parameter representing a start radio frame of the uplink grant resource;

a second parameter representing a start sub-frame of the uplink grant resource;

a duration parameter of the uplink timer;

CS-RNTI information;

a third parameter representing a number of Hybrid Automatic Repeat reQuest (HARQ) processes available for the uplink grant resource;

a time interval between adjacent uplink grant resources; or a time-frequency resource position of the uplink grant resource, wherein the processor is configured to perform downlink synchronization with the target network device, and determine start time of the uplink grant resource based on the first parameter and the second parameter;

control, in case that time of completion of the downlink synchronization is not later than the start time of the uplink grant resource, the transceiver to transmit the handover complete message on a first available uplink grant resource, and control, in case that the time of completion of the downlink synchronization is later than the start time of the uplink grant resource, the transceiver to transmit the handover complete message on a first available uplink grant resource after the time of completion of the downlink synchronization.

13. A network device, comprising:

a processor;

a transceiver; and a memory is coupled with the transceiver and the processor, and is configured to store computer programs that, when executed by the processor, cause the processor to:

control the transceiver to receive a handover complete message transmitted by a terminal device through an uplink grant resource in a first type of handover; and reclaim the uplink grant resource released by the terminal device, wherein the uplink grant resource is an uplink resource, configured for the terminal device in a handover command, for accessing a target network device, wherein the processor is configured to control the transceiver to transmit at least one of a first downlink channel for scheduling an uplink transmission resource for new transmission or a second downlink channel for scheduling an uplink transmission resource for retransmission to the terminal device for monitoring during an operation of an uplink timer, the uplink timer being started when the handover complete message is transmitted, wherein the first downlink channel is a Physical Downlink Control Channel (PDCCH) scrambled with a Cell-Radio Network Temporary Identifier (C-RNTI), and the second downlink channel is a PDCCH scrambled with a Configured Scheduling-Radio Network Temporary Identifier (CS-RNTI);

wherein the monitoring of the second downlink channel for scheduling the uplink transmission resource for retransmission triggers retransmission of the terminal device based on the uplink transmission resource scheduled by the second downlink channel, and restarting of the uplink timer; and expiration of the restarted uplink timer is considered as an indication that the handover complete message is correctly received by the network device, and an indication that the uplink grant resource is released by the terminal device.

14. The network device of claim 13, wherein the first type of handover is Random Access Channel-less (RACH-less) handover.

15. The network device of claim 13, wherein the processor is configured to control the transceiver to transmit the handover command to the terminal device, wherein the handover command comprises Random Access Channel (RACH) skip information for indicating the uplink grant resource, wherein the RACH skip information comprises at least one of:

a first parameter representing a start radio frame of the uplink grant resource;

a second parameter representing a start sub-frame of the uplink grant resource;

a duration parameter of the uplink timer;

CS-RNTI information;

a third parameter representing a number of Hybrid Automatic Repeat reQuest (HARQ) processes available for the uplink grant resource;

a time interval between adjacent uplink grant resources; or a position of the uplink grant resource.

* * * * *